Jan. 15, 1935.　　　　　I. O. PEDERSEN　　　　　1,987,633
METHOD OF MANUFACTURING GLASS TUBING
Filed Aug. 31, 1929
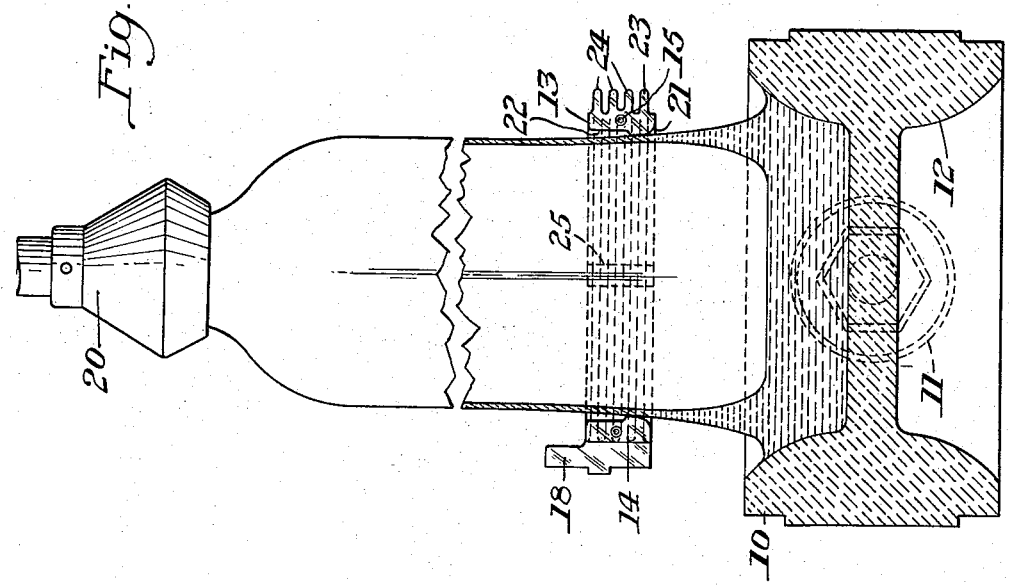
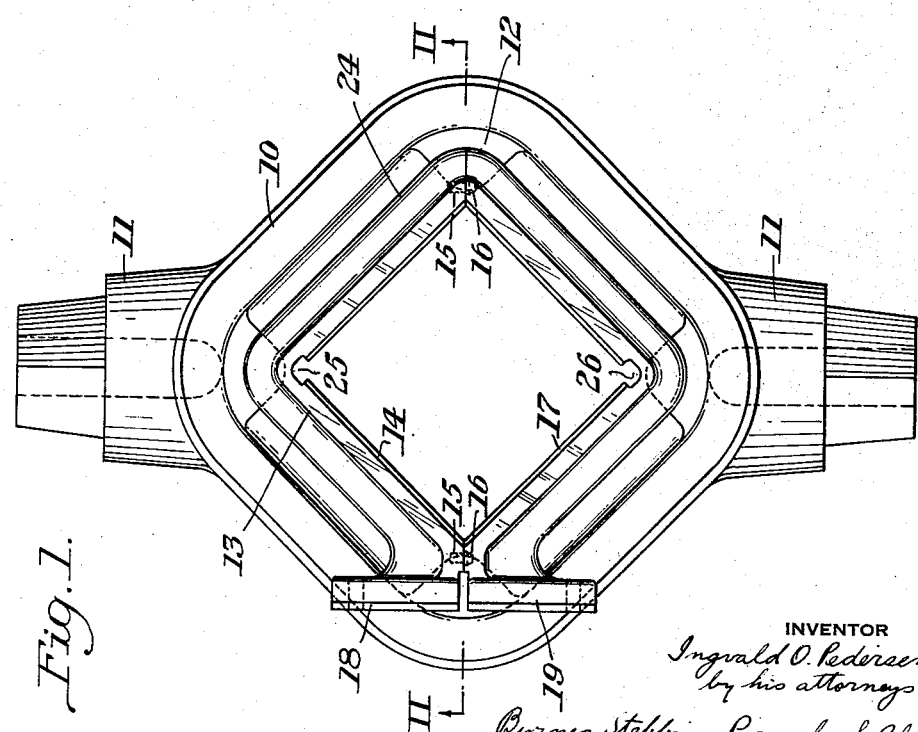
INVENTOR
Ingvald O. Pedersen
by his attorneys
Byrnes, Stebbins, Parmelee & Blenko Patented Jan. 15, 1935

1,987,633

UNITED STATES PATENT OFFICE 1,987,633

METHOD OF MANUFACTURING GLASS TUBING

Ingvald O. Pedersen, Wilkinsburg Pa.

Application August 31, 1929, Serial No. 389,823

6 Claims. (Cl. 49—83.1)

My invention relates to a method of and process for making hollow polygonal glass shapes by drawing through a die.

In my copending applications Serial No. 310,279, filed October 4, 1928, 339,546 filed February 13, 1929, 366,787 filed May 29, 1929, I have disclosed methods and means for drawing hollow circular cylinders from a molten mass of glass through a circular forming die. The systems and apparatus disclosed in the copending applications are eminently satisfactory for the manufacture of glass cylinders. The present invention provides means for forming hollow polygonal shapes by a die drawing process.

A present preferred embodiment of my invention is illustrated in the accompanying drawing in which Figure 1 is a partial plan view of a glass drawing apparatus, and Figure 2 is a partial section along the line II—II of Figure 1.

Referring to the drawing in detail, the illustrated embodiment includes a pot or enclosure 10 of refractory material which is given a square outline. At opposite corners of the square formed by the wall of the pot 10 supporting trunnions 11 are provided for engagement with cooperating supports (not shown) whereby the pot 10 is positioned over a suitable furnace for maintaining the contents thereof at the desired temperature. The pot 10 is preferably of the reversible type as best shown in Figure 2, having opposed glass containing cavities with a common bottom. The corners of the glass containing cavities of the pot are provided with filled out portions 12 which prevent the collection and devitrification of glass at these points.

The forming die which I utilize in connection with the pot 10 is illustrated at 13. This die is formed of two similar portions which, when placed adjacent each other, form a square similar to that outlined by the walls of the pot 10 and of smaller dimensions. The half portion 14 of the die 13 is provided with dowel studs 15 for cooperation with recesses 16, correspondingly located in the half portion 17 of the die 13. The portions 14 and 17 of the die are provided with suitable extensions 18 and 19 by which the portions of the die may be actuated. As disclosed in the copending applications referred to, the die portions will preferably be arranged for rotary movement by any convenient means so that the complete die may be opened to permit the downward movement of a bait 20. The supporting and actuating means provided for the die 13 are not essential to the present invention and are not shown for that reason.

By reference to Figure 2 it will be observed that the portions of the die 13 are provided with a lower projecting forming face 21, and an upper recessed portion 22. The die 13 is also provided with peripheral heat radiating fins 23 and 24. The lower fins serve not only as heat radiators but also as shields to prevent the radiation of heat from the molten glass to the upper portions of the die. The combined action of the fins 23 and 24 cause the temperature of the forming die to be maintained at the proper value. The temperature of the forming die is a very important matter in drawing glass since, if the die is too cold, the drawn glass will be permanently set and consequently checked and marred instead of being perfectly formed by the die, whereas if the die is too hot, the glass will stick thereto as it is drawn.

The corners of the die 13 which are not traversed by the line of division between the two portions of the die are recessed as shown at 25 and 26 to facilitate the machining of the die faces in a shaper.

In order to draw polygonal shapes by means of the apparatus described herein above, it is only necessary to separate the portions 14 and 17 of the die 13, lower the bait 20 into the molten glass, lift the bait slowly admitting air pressure therethrough, close the die around the shape thus formed and continue the slow upward movement of the bait 20. The result of this operation will be the formation of a continuous hollow glass shape of polygonal cross section determined by the shape of the die 13, in this case, square. When the glass shape has been drawn to the desired length, it is capped or cut into sections. The sections are then subjected to an annealing treatment to remove internal strains therefrom, after which the sections are split axially along the intersections of their sides to form flat sheets of glass.

One advantage which results from the use of a diagonally split die is that any deformation of the drawn shape caused by the joints between the die portions does not seriously affect the quality of the finished product since the drawn shapes are split along the intersections of the sides of the die and any marks formed at those points are removed when the shape is split and the side sections thereof trimmed to size.

I have found in practice that the drawn glass shape contacts with the forming die only at a comparatively small portion of the forming surface 21. After the glass passes this point, it is further cooled, contracts slightly and sets firmly. It is quite important that the shape of the pot conform to that of the die, although there is practically no limit to the shape chosen. Although a square pot and die have been illustrated and described, I contemplate also the use of dies and pots of other polygonal shapes.

Another important feature of the invention is the comparative dimensions of the pot and die. Experience has proved that the distance from the inner face of the forming die to the inner edge of the pot wall should not exceed 8 inches and preferably should not be over 6 or 6½ inches. These dimensions permit the proper cooperation of the pot and die to produce the desired size and shape of drawn glass. If the distance between the forming face and pot wall is excessive, the drawn glass will be cooled to such an extent that its set prevents drawing. In an actual test, an attempt was made to draw 12⅝ inch cylinders from a 40 inch pot, the distance between the die face and pot wall being approximately 13.7 inches. This attempt proved unsuccessful because the distance travelled by the glass on the surface of the molten mass permitted cooling to such an extent that the cylinder was prematurely set. Another attempt was made using a 25½ inch pot which left a margin of 6.43 inches between the 12⅝ inch die and the pot wall. This attempt proved entirely successful and tends to prove that the dimensions of the pot must not be too greatly in excess of those of the die.

Another important point is the vertical distance between the die and the surface of the molten glass. I have found that when the die is positioned 5 to 6 inches above the level of the glass, the best results are produced.

It will be apparent that the method and apparatus of my invention hereinabove described afford a highly desirable means of producing sheet glass in large quantities without interruption and at comparatively small expense. The invention also makes possible the manufacture of a number of other articles of novel form and desirable construction. As an example, a section of the drawn polygonal tube herein described may be employed as a show case for stores by providing a suitable base and top thereon. Another type of case may be formed by cutting the section axially along diagonally opposite corners. The resulting L-shaped section, when fitted with back, bottom and end walls, forms a show case having a glass top and front in one piece without the disadvantages inherent in the usual jointed construction. The hollow glass meniscus may, of course, be drawn from within a refractory ring floating on glass within the forehearth of a tank furnace, in which case the enclosing ring is preferably of a polygonal cross section; the general equivalency between floating rings and forehearths and pot drawing being well known in this art.

Since the invention is obviously not limited to the specification embodiment described and illustrated herein, alterations and changes therein may be made within the scope of the following claims without departing from the spirit of the invention.

I claim:

1. In the manufacture of polygonal tubing, the steps consisting of drawing upwardly a hollow meniscus from a bath of molten glass, preventing narrowing in of the meniscus by gaseous pressure within the same, deflecting the rising walls inwardly by sliding contact with a polygonal shape, and maintaining the cooling surface below the sticking point.

2. In the manufacture of polygonal tubing, the steps consisting of drawing upwardly a hollow meniscus from a bath of molten glass, preventing narrowing in of the meniscus by gaseous pressure within the same, deflecting the rising walls inwardly by sliding contact with a polygonal shape, and maintaining the cooling surface below the sticking point and above the checking or cracking temperature.

3. In the method of forming polygonal glass tubing, the steps consisting in drawing upwardly from a bath of molten glass a hollow meniscus, preventing narrowing in of the meniscus by gaseous pressure within the same, cooling the meniscus while out of contact with a shaping surface, and then deflecting the walls inwardly to polygonal shape by sliding contact with a cooling surface.

4. In the method of forming polygonal glass tubing, the steps consisting in drawing upwardly from a bath of molten glass a hollow meniscus, preventing narrowing in or the meniscus by gaseous pressure within the same, cooling the meniscus while out of contact with a shaping surface to a temperature at which it will set to substantially final thickness by sliding contact with a cooling surface, and then deflecting the walls inwardly to polygonal shape and setting them to substantially final thickness by sliding contact with a cooling surface.

5. In the method of forming polygonal glass tubing, the steps consisting in drawing upwardly from a bath of molten glass a hollow meniscus, preventing narrowing in of the meniscus by gaseous pressure within the same, cooling the meniscus while out of contact with a shaping surface, then deflecting the walls inwardly to polygonal shape by sliding contact with a cooling surface, and then forming a plurality of articles from the drawn polygonal article by severing it longitudinally.

6. In the method of forming polygonal glass tubing, the steps consisting in drawing upwardly from a bath of molten glass a hollow meniscus, preventing narrowing in of the meniscus by gaseous pressure within the same, cooling the meniscus while out of contact with a shaping surface, then deflecting the walls inwardly to polygonal shape by sliding contact with a cooling surface, and then forming a plurality of articles from the drawn polygonal article by severing it longitudinally along its corner portions.

INGVALD O. PEDERSEN.